Oct. 23, 1934.  G. W. HAURY  1,978,047
PACKING FERRULES FOR FRICTION COUPLINGS
Filed Feb. 18, 1932
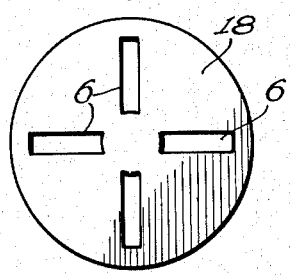
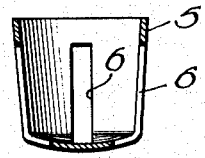
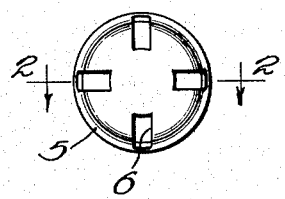
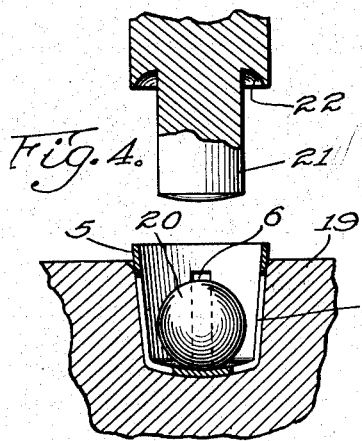
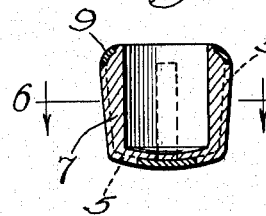
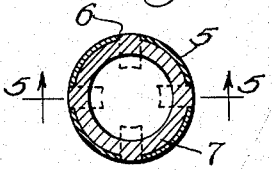
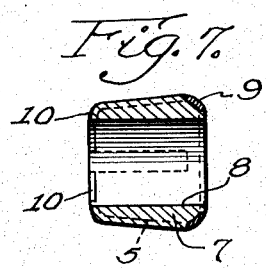
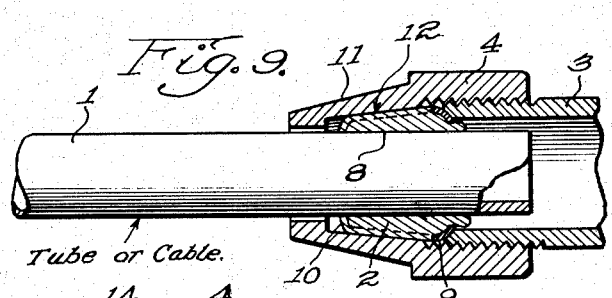
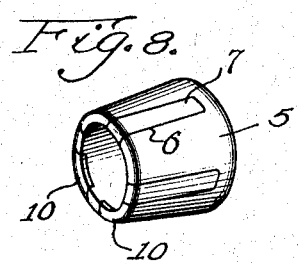
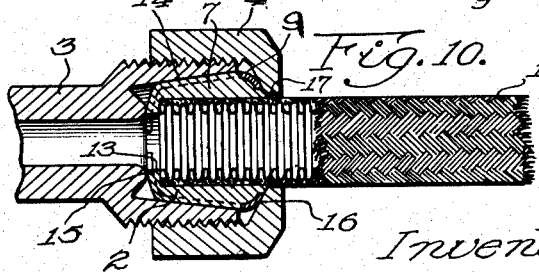
Witness
Arthur M. Franke,
Inventor
George W. Haury.
by Rummler, Rummler & Woodworth
his Attys.

Patented Oct. 23, 1934

1,978,047

UNITED STATES PATENT OFFICE 1,978,047

PACKING FERRULES FOR FRICTION COUPLINGS

George W. Haury, Chicago, Ill.

Application February 18, 1932, Serial No. 593,821

9 Claims. (Cl. 285—122)

This invention relates to the art of connecting fittings to metal pipe, flexible tubing and the like, and particularly to an improved form of packing ferrule for such connections, and to the method of making same.

The main objects of this invention are to provide an improved self-sealing packing ferrule for tube joints; to provide such a packing ferrule having a relatively soft internal lining capable of flowing under pressure to effectively seal the connection between the ferrule and the tube against fluid leakage; to provide such a packing ferrule that may be wedged between the interfitting parts of a pipe fitting and by such wedging action be contracted so as to grip a tube or cable and form a pressure tight seal; to provide a packing ferrule that will seal the end edges of armored flexible tubing as well as forming a pressure tight packing between such tubing and a fitting; and to provide an improved method of making metal lined packing ferrules.

A specific embodiment of this invention is shown in the accompanying drawing, in which:

Figure 1 is a plan of the blank from which the ferrule shell is formed.

Fig. 2 is a sectional view of the cup shaped shell after it has been drawn from the flat blank of Fig. 1.

Fig. 3 is an end view of the same.

Fig. 4 is a sectional view showing the cupped shell, with a ball of lead or soft metal therein, seated in a die block; the tool for forming the lining and contracting the rim of the shell being shown above.

Fig. 5 is a sectional view showing the ferrule after the lining has been swedged into form within the shell.

Fig. 6 is a sectional view of the same taken on line 6—6 of Fig. 5.

Fig. 7 is a longitudinal sectional view of the same after the cupped end has been punched out.

Fig. 8 is a perspective view of a finished packing ferrule.

Fig. 9 is a sectional view of an assembled tube coupling, showing the improved packing ferrule applied to the joint of a tube with a threaded pipe or fitting, shown partly broken away.

Fig. 10 is a sectional view of another form of tube coupling showing the packing ferrule as used for securing and sealing the end of armored flexible tubing.

As shown in the drawing, a complete assembled coupling embodying my invention may comprise a rigid or flexible tube 1, upon which is placed a packing ferrule or sleeve 2, a fitting 3 which may be any kind of pipe fitting or fixture to which the tube 1 is to be connected and a cap or nut 4.

In the form shown in Figs. 1 to 9, the packing ferrule or sleeve 2 consists of a circular shell 5 having a plurality of elongated peripheral perforations or slots 6 and an internal lining or sleeve 7, the ferrule having a cylindrical bore 8 extending therethrough from end to end for the reception of the tube on which it is to be used. The shell 5 is preferably made in a tapered external form, such as a truncated cone, and is provided with an endlessly annular inwardly projecting convex rim or flange 9 at the large end.

The small end also is provided with an inwardly projecting rim comprising several segments 10 formed between the extension of the perforations or slots 6 from a point adjacent the flange 9 to the small end of the shell. The slots 6 being extended to the end of the shell cause the body of the shell to take the form of a plurality of tongue-like extensions from the annular flange 9 which embrace the sides of the lining 7.

The lining 7 is formed of a relatively soft material which is pressed into the shell 5 and partially extruded through the slots or perforations 6 so as to be flush with the external surface of the shell 5. The purpose of the extruded lining is to provide a certain bond between the lining and the shell and to prevent relative rotation of these parts and also to permit the shell to contract as will hereinafter appear. As shown in Fig. 7, the diameter of the bore 8 is preferably smaller than the diameter at the inside edge of the convex rim or flange 9 and the flange segments 10 are inclined somewhat away from the shell body. These flanges serve to retain the lining 7 within the shell but are preferably disposed in inclined position so that they will not bear on the tube and prevent or resist contraction of the ferrule as it adapts itself to the pipe and fitting under pressure.

The packing ferrule shown in Figs. 7, 8 and 9 is provided with a bore of uniform diameter throughout its length and is the type that would be used on plain metal pipe or tubing or a solid rod or cable. In such use the packing ferrule is slipped over the end of the tube or cable 1 as shown in Fig. 9, and brought into abutment with the end of the fitting 3 which is usually provided with a slight counterbore to engage the annular band or flange 9. The nut 4, which is provided with a shank 11 having an internally tapered bore 12 adapted to engage the sides of the packing ferrule 2, is then passed over the ferrule 2 and brought into threaded engagement with the fitting 3. The fitting 3, as shown, is provided with external threads and the nut 4 with internal threads.

As the nut 4 is threaded onto the fitting 3, the tapered bore 12 will engage the sides of the ferrule 2 and cause the same to contract peripherally in a uniform manner, thereby compressing the relatively soft lining 7 to a tight fit around the tube or cable 1. The peripheral contraction of the ferrule 2 progresses uniformly along the ferrule towards the fitting 3 until the nut 4 is tight on the fitting, and this progressive contraction of the ferrule causes the lining 7 to extrude beyond the flange 9 to further increase the effectiveness of the seal. The flanges 10 under the contractural pressure are caused to slightly flatten out in an axial direction and tightly hug the tube or cable 1 and therefore will not cut into or weaken the walls of a tube even though the same be made of relatively soft material such as copper. Thus, when the nut 4 is drawn tightly on the fitting 3 a sealed connection is formed that is proof against leakage of either gas or liquid up to pressures equivalent to the bursting pressure of the tube or fitting.

The material used to form the lining 7 of the packing ferrule may be of any substance softer than the material used to form the shell 5 and suitable to the pressures and temperatures to which the connection will be subjected. When metal is used for the lining it must be sufficiently ductile to flow under the pressures created by the wedging action of the tapered bore 12 on the sides of the ferrule. Such metal might be lead or copper according to the temperature conditions, and if the fitting and tubing are to conduct high pressure steam, a suitable ferrule lining may be made from reinforced asbestos composition.

Fig. 10 shows my improved packing ferrule as applied in a coupling for armored or woven metal covered tubing wherein it is necessary to seal the end edges of the tubing to prevent leakage between the tubing and the covering or armor.

In such cases a slightly modified form of packing ferrule is used and a different arrangement of nut and fitting is preferable. The ferrule is of much the same type as shown in Figs. 7, 8 and 9 with the exception that the inwardly projecting flanges 10 at the small end of the ferrule extend further toward the axis of the ferrule and thereby form an annular shoulder with an end aperture 13 somewhat smaller than the main bore 8. The lining sleeve 7, in this case, is extended along the flanges 10 so that the entire inner surface of the shell 5 is covered.

As shown in Fig. 10, the fitting 3 is provided with an inwardly tapered counterbore 14 adapted to receive the packing ferrule, and is also provided with an annular backwardly extending shoulder 15 at the bottom of the bore 14. The nut 4 in this case has an inwardly projecting annular shoulder 16, at the back end. The aperture 17 in the back end of the nut, through which the tube passes, will be of a diameter slightly larger than the external diameter of the tube 1.

In the assembly of this type of coupling, the armored flexible tubing 1 is first inserted through the aperture 17 of the nut 4 and then into the packing ferrule 2 until the end of the tubing 1 abuts the annular shoulder formed by the extended flanges 10 at the small end of the ferrule. The end of the tubing with the ferrule thereon is then partially inserted in the tapered counterbore 14 of the fitting 3, and the nut 4 is brought into threaded engagement with the fitting. As the nut 4 is drawn onto the fitting, the nut shoulder 16 will engage the convex flange 9 at the large end of the ferrule and force the ferrule into the tapered bore 14 of the fitting 3. As the ferrule is forced into the fitting, the same contractive action will be had as was described for the ferrule used in the coupling shown in Fig. 9. However, in this case the ferrule 2 will be forced into the tapered bore 14 until the flanges 10 at the small end of the ferrule are engaged by the annular shoulder 15 within the fitting.

The engagement with the shoulder 15 will force the flanges 10 backwardly against the end edges of the tubing 1 and cause the soft lining 7 to force its way into, and completely seal, the space between the tubing and its outer armored covering. After this fitting has been assembled, it will be found that the peripheral contraction of the ferrule has caused the lining to extrude beyond the flange 9 at the large end and into the annular space between the tube 1 and the walls of the aperture 17 of the nut 4, as well as cause the ferrule 2 to take firm grip on the end of the tube 1.

This type of coupling, as shown in Fig. 10, is particularly adapted for use with armored tubing, because the necessity for soldering the end of the tubing to seal the space between the armor and the tubing walls can in most cases be completely eliminated, and furthermore, the annular space between the aperture 17 of the nut 4 and the tubing will be sealed so that no moisture could possibly leak therethrough to cause damage in case the fitting should be frozen, as would be likely in refrigeration applications.

My invention also includes an improved method for making or forming the packing ferrules. This method consists in perforating a circular disk 18 of suitable sufficiently ductile material with a number of radially disposed and angularly spaced elongated slots 6 as shown in Fig. 1 of the drawing. The disk 18 is then drawn by suitable dies (not shown) into a cup shaped form or shell 5 as shown in Figs. 2 and 3. The cup or shell 5 is then inserted into a die block 19 and a predetermined quantity of a relatively soft ductile metal, preferably in the form of a pellet or ball 20, is placed in the bottom of the cup 5 and the same is then pressed by means of a plunger die 21 and caused to flow along the inner surface of the shell 5 to form a lining for the same, the die 21 having a diameter equal to the diameter of the tube or cable on which the ferrule is to be used.

The annular inwardly projecting rim or flange 9 is formed on the shell at the time the metal lining is being flowed or extruded around the inner surface of the shell and this flange formation is accomplished by means of an annular concave shoulder 22 on the die 21. The formed and lined ferrule will now have the appearance of a thimble as shown in Figs. 5 and 6, and the finishing operation on the ferrule merely comprises aperturing the cupped end according to the requirements of the use to which the ferrule is to be put. For a coupling as shown in Fig. 9, the aperture at the cup or small end of the ferrule will be of the same diameter as the main bore formed by the die 21; and in the type of coupling as shown in Fig. 10, the aperture will be smaller than the diameter of the main bore and will be approximately the same as the smallest internal diameter of the tubing on which the ferrule is to be used, It will be noted that as the lining material 20 is extruded or flowed by the die 21, it will completely fill the perforations 6 in the sides of the shell 5. Also, the die 21 is so proportioned that when it has reached the end of its compression or extruding stroke, it will be spaced from the cup bottom of the shell 5 in order to provide a coating of the lining material thereon. The bottom or cupped portion of the shell 5 is preferably rounded, somewhat as shown in Figs. 2 and 5, in order that the flanges 10, when formed by the aperturing operation, will be axially inclined away from the end of the shell.

Although but one specific embodiment of this invention is herein shown and described, it will be understood that details of the construction shown may be altered or omitted without departing from the spirit of this invention as defined by the following claims:

I claim:

1. A packing ferrule comprising an annular body of ductile material and a shell comprising an endlessly annular band enclosing one end of said body and having spaced tongue-like extensions embracing the sides of said body.

2. A packing ferrule for friction couplings, comprising a tapered annular body of ductile material, and a shell comprising a unitary annular band enclosing the large end of said body and having spaced tongue-like extensions embracing the sides of said body in flush relation therewith.

3. A packing ferrule for tube couplings comprising a tapered hollow circular shell having an opening at each end and a plurality of side apertures, and a relatively soft lining on the internal surface of said shell, said lining being extruded through said side apertures to the external surface of said shell.

4. A packing ferrule for friction couplings, comprising a contractible circular outer shell, and a relatively soft lining on the internal surface of said shell, said shell having a lateral slot extending to one end thereof.

5. A packing ferrule for friction couplings, comprising a contractible conoidal shell, and a relatively soft lining on the internal surface of said shell, said shell having lateral slots extending to one end thereof.

6. A coupling comprising a tapered packing ferrule having its body slotted from one end to a point adjacent the other end and having an endlessly annular inwardly contracted margin at said other end, a relatively soft sleeve within said ferrule and lining the same, a nut having an internally threaded portion and an internally tapered shank beyond said threaded portion, and a fitting coaxially abutting the endlessly annular contracted end of said ferrule, said fitting being externally threaded for engagement with said nut and said ferrule being arranged to fit into the tapered shank of said nut.

7. A coupling comprising a threaded hollow fitting member, a tube entering said fitting member, and a radially contractible tapered ferrule on said tube coaxially engaging said fitting member, said ferrule comprising an annular shell having its body slotted longitudinally from its small end to a point spaced from its large end, a relatively soft sleeve lining said ferrule and engaging said tube, a nut member coaxial on said tube and engaging said ferrule, said nut member having threaded engagement with said fitting member, and a tapered portion within one of said members arranged to fit and receive said ferrule for contracting the slotted body of said ferrule radially about said tube upon engagement of said members.

8. A packing ferrule comprising a tapered hollow annular shell having its periphery slotted longitudinally and having a lining of ductile metal with portions extending flush with the external periphery of the shell at the slots.

9. A packing ferrule for friction couplings, comprising a tapered hollow annular shell having its periphery slotted longitudinally from one end to a point spaced from the other end, said other end being endlessly annular and having its margin contracted inwardly, and a lining of ductile material on the inside of said shell, said lining having a longitudinal bore of less diameter than the diameter at the inner edge of the contracted margin of the endlessly annular end of said shell.

GEORGE W. HAURY.